No. 12,298. REISSUED DEC. 27, 1904.
L. K. LEAHY.
HYDROCARBON BURNER.
APPLICATION FILED FEB. 10, 1903.
2 SHEETS—SHEET 1.
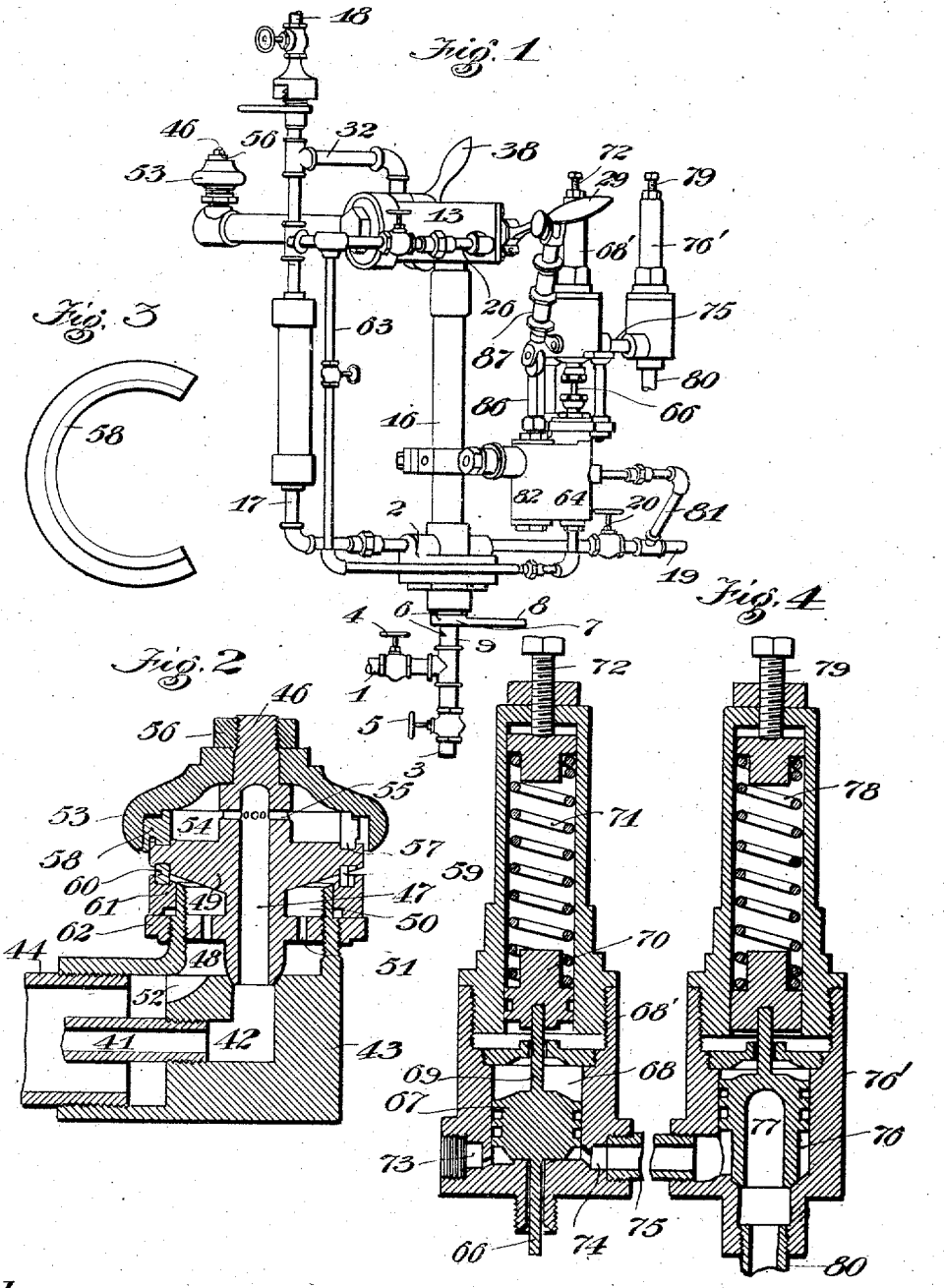
Witnesses
Edmund A. Strauss.
Frederick D. Lyon
Inventor
Louis K. Leahy
by Townsend Bros
his Attys.

No. 12,298. REISSUED DEC. 27, 1904.

L. K. LEAHY.

HYDROCARBON BURNER.

APPLICATION FILED FEB. 10, 1903.

2 SHEETS—SHEET 2.

Witnesses

Edmund A. Strauss

Frederick D. Lyon

Inventor

Louis K. Leahy by Townsend Bros.

his attys.

No. 12,298. Reissued December 27, 1904.

UNITED STATES PATENT OFFICE.

LOUIS K. LEAHY, OF LOS ANGELES, CALIFORNIA.

HYDROCARBON-BURNER.

SPECIFICATION forming part of Reissued Letters Patent No. 12,298, dated December 27, 1904.

Original No. 709,782, dated September 23, 1902. Application for reissue filed February 10, 1903. Serial No. 142,768.

*To all whom it may concern:*

Be it known that I, LOUIS KELLER LEAHY, a citizen of the United States, residing at Los Angeles, in the county of Los Angeles, State of California, have invented new and useful Improvements in Hydrocarbon-Burners, of which the following is a specification.

My invention relates to that class of hydrocarbon-burners designed to burn crude petroleum with steam; and the objects thereof are to produce a burner that will burn all grades of crude petroleum and which will regulate the amount of fuel burned automatically by the pressure of the steam and accomplish other purposes hereinafter explained, and pointed out in the claims.

Figure 5:
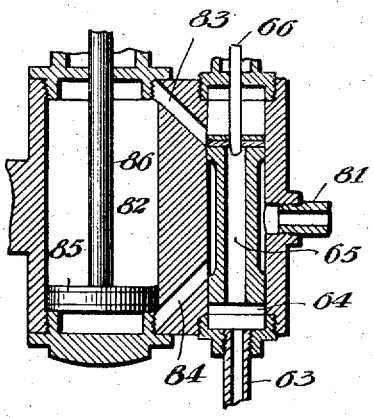

In the drawings forming a part of this application, Figure 1 is a perspective view of my burner. Fig. 2 is a central vertical section of the burner-tip and portions of the connecting-pipes. Fig. 3 is a plan of a portion of the tip. Figs. 4 and 5 are detail views, in central section, of different parts of the regulating device. Figs. 6, 7, 8, and 9 are detail views of different parts of my burner.

Figure 7:
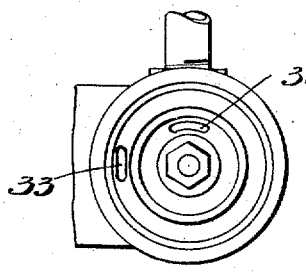
Figure 6:
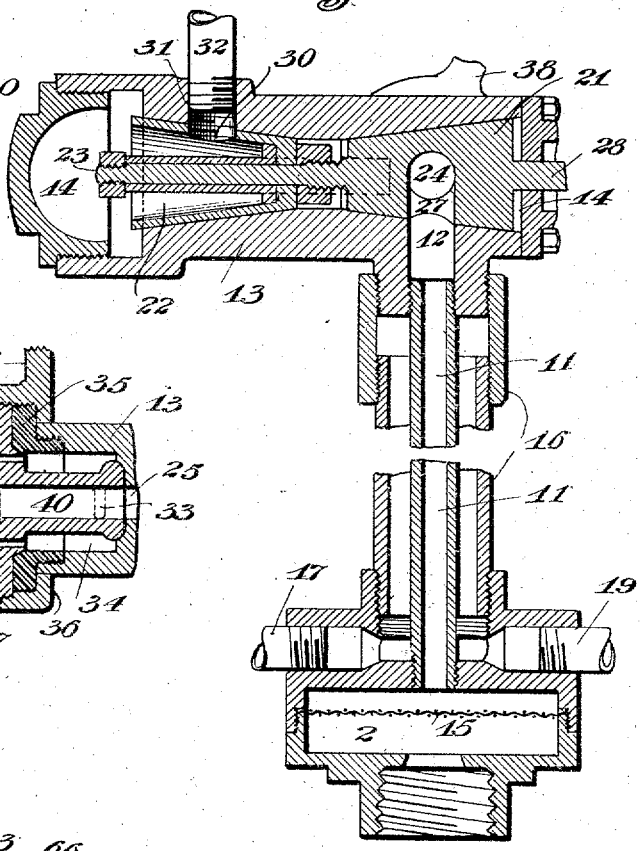
Figure 8:
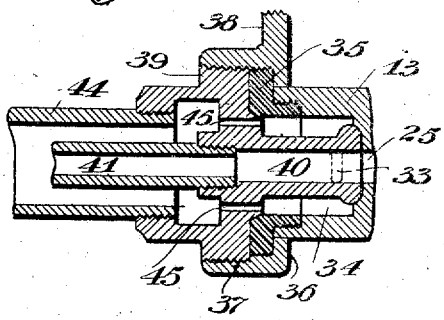
Figure 9:
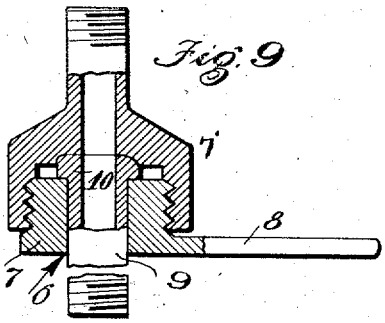

In the drawings, Fig. 1, 1 is the oil-supply pipe, which feeds the oil to the burner through the strainer 2. A blow-off pipe 3 connects with the supply-pipe below the strainer. These pipes are provided with cut-off valves 4 and 5, respectively. The upper end of the blow-off pipe is connected with the strainer by an improved coupling-joint 6, the details of which are shown in Fig. 9. This improved coupling consists of externally-threaded sleeve 7, having handle 8, which sleeve encircles the central coupling member 9, having shoulder 10, and rotates and slides thereon when operated. This sleeve screws into the connection 7′, which in turn is adapted to screw into the bottom of the casing of strainer 2. (Shown in detail in Fig. 6.) In the top of the casing of the strainer-chamber is screwed oil-tube 11, the other end of which is screwed into aperture 12 in the casing 13 of the valve-chamber 14. This tube connects the strainer with the valve-chamber, which is preferably of the shape of an hour-glass. In the strainer-chamber is the screen 15, through which the oil passes. Surrounding the oil-tube and connected with the casing of the valve-chamber and with the casing of the strainer-chamber is the steam-pipe 16, which forms a heating-chamber around the oil-tube. Connected with the casing of the strainer-chamber is steam-pipe 17, which connects with the steam-supply pipe 18, which in turn is connected with the steam-supply. (Not shown.) Exhaust-pipe 19, having cock 20 thereon to control the amount of exhaust-steam which passes therethrough, is connected with the casing of the strainer-chamber, as shown in Fig. 6. In valve-chamber 14 are revolubly mounted the tapering oil-valve 21 and the hollow tapering steam-valve 22, which are adjustably united by bolt 23, so that they may be rotated together to regulate by a single movement of the regulator, as hereinafter explained, the quantity of steam and oil passing therethrough. The oil-valve is provided with a transverse channel 24, which registers with the port 25 (shown in Fig. 8) in the casing of the valve-chamber and with a like port in the opposite side of the said casing opening into the steam-blow-out pipe 26, which is connected with pipe 17, so that the oil-passage leading to the burner-tip and the oil-chamber in the tip may be cleaned with steam. At right angles to channel 24 and opening thereinto is a second channel, 27, which is adapted to connect channel 24 with the oil-tube 11 through port 12. Valve 21 is provided with stem 28, which projects through the casing of the valve-chamber, to which stem lever 29 is rigidly affixed. Steam-valve 22 is provided with a port 30, which is adapted to register and be cut off from register with an internally-threaded opening 31 in the casing of the valve-chamber, in which is screwed pipe 32, the other end of which is connected with pipe 17. The internal hollow of the steam-valve is in communication with chamber 14, which chamber is in communication through passage 33 with chamber 34 in that portion of the casing of the valve-chamber which projects at right angles to the central line of the steam and oil valves shown in Figs. 7 and 8. Screwed into the end of the casing forming chamber 34 is the flanged bushing 35, which provides a bearing-surface for the flange 36 of the internally-threaded coupling-ring 37, having handle 38. This coupling-ring is adapted to be screwed upon the coupling member 39, which has a central aperture 40 extending therethrough, adapted when in place to register with port 25. The details of the coupling member and the connecting parts are shown in Fig. 8. As shown therein, an oil-conduit 41 has one end screwed into aperture 40 and the other end in central passage 42 of casing 43 of the burner-tip, Fig. 2. A steam-conduit 44 is also screwed into said coupling member and into the casing of the burner-tip, as shown in Figs. 2 and 8, which forms a steam-conduit from the chamber 34 to the burner-tip, communication being had through ports 45 in the coupling member, as shown in Fig. 8. The lower flange on the tip-plug 46, Fig. 2, which has a central passage 47 extending longitudinally to nearly the top thereof and registering with passage 42, is screwed into the casing 43 of the burner-tip, said lower flange 48 being externally threaded for that purpose. Above flange 48 is a second flange, 49, which projects beyond flange 48, the two flanges and the tip-casing forming a steam-expansion chamber 50, which is in communication with the steam-conduit pipe through ports 51 in flange 48 and side passage 52 in the tip-casing. On the top of the tip-plug is mounted cap 53, which projects a little beyond and a little below the upper surface of the upper flange of the plug and forms therewith oil-chamber 54, which is in communication with passage 47 through ports 55. This cap is held in place by nut 56. Flange 49 is provided in its upper surface with an annular groove 57 for the reception of the oil-supply-regulating ring 58, which is held therein by the cap and may have a portion thereof cut out, as shown in Figs. 2 and 3, to permit the oil to flow out of chamber 54. The under surface of flange 49 is provided with an annular groove 59 for the reception of the steam-regulating ring 60, which is cut out to correspond with the oil-regulating ring, and the two rings are arranged one directly above the other, so as to permit the oil from the oil-chamber to fall directly upon the steam issuing from the steam-chamber. The steam-regulating ring is held in contact with flange 49 by the annular ring 61, which rests on the internally-threaded ring 62, which is screwed upon the exterior of the tip-casing and supports ring 61 and holds it firmly in contact with the steam-regulating ring. When it is desired to have a circular flame, the oil and steam regulating rings are removed from the tip. When a fan-shaped flame is desired, the portion of each ring 58 60, respectively, which is cut out regulates the size of the flame, and the position in which they are placed in the tip controls the direction in which the flame is projected. Portions of these rings may be cut out at different points and a flame consisting of a number jets shooting out in different directions will be produced. The details of the various parts constituting the burner-tip are illustrated in Figs. 2 and 3.

In the operation of my device oil is fed into the burner through the strainer, which removes all solid impurities which are too large to pass therethrough. Steam is also fed into the burner and a portion thereof passes into the steam-valve chamber and thence through connecting parts to and out of the burner-tip. A portion of the steam passes through pipe 17 into pipe 16 and heats the oil in pipe 11. Cock 20 on exhaust-pipe 19 is slightly opened, so that a constant supply of fresh steam will enter pipe 16 and circulate around the oil-pipe. As work varies the steam-pressure in the boiler varies, and this causes a waste of fuel unless the quantity thereof is regulated.

In my burner I automatically regulate the supply of both steam and oil by the steam-pressure in the boiler. To accomplish this, I connect pipe 62 with pipe 26. Pipe 63 connects with valve-chamber 64, in which is mounted hollow valve 65, to the upper end of which is attached stem 66 of regulating-piston 67, which piston is mounted in chamber 68, having a casing 68′. Piston 67 has an upwardly-extending stem 69, the upper end of which is seated in guide-plug 70, which is held spring-pressed by spring 71, the tension of which is regulated by screw 72. Piston 67 is cut away at its bottom, as shown in Fig. 4; but the cut-away portions are not connected. In the lower portion of piston-chamber 68 is exhaust-port 73, while oppositely disposed thereto is supply-port 74, which is connected by pipe 75 with the regulating-valve chamber 76, having casing 76′, in which is seated valve 77, held normally spring-pressed on its seat by spring 78, the tension of which is regulated by screw 79. Opening into valve-chamber 76 below valve 77 is steam-supply pipe 80, which runs to and connects with the steam-space in the boiler. (Not shown.) Valve-chamber 64 (see Fig. 5) is connected by pipe 81 with exhaust-pipe 19. It is also in communication with the top and bottom of piston-chamber 82 through ports 83 and 84. In this chamber is mounted the steam and valve regulating piston 85, having stem 86, which is connected by an adjustable link 87 with lever 29. Now when the pressure rises above the pressure required to perform the necessary work it exerts a pressure on valve 77 great enough to raise it off its seat, which permits the steam to pass into piston-chamber 68 and raise piston 67 against the pressure of spring 71, which causes stem 66 to raise valve 65 to cover port 83 and uncover port 84. The steam then passes through port 84 into piston-chamber 82 below piston 85. The upper portion of the piston-chamber exhausts through exhaust-pipe 81 and the piston rises and through connecting parts operates both the steam and oil valves to cut off the supply of both to the burner-tip, and thus reduce the amount of fuel burned, which soon causes such a reduction of steam-pressure in the boilers that the pressure of spring 78 reseats valve 77. The steam in piston-chamber exhausts through port 73 when spring 71 pushes piston 67 to its seat, which returnes valve 65 to its normal position, which permits the steam in the lower part of piston-chamber to exhaust and the steam-pressure to be applied on the top of the piston to return it to its normal position and through connecting parts to return the oil and steam valves to their normal position. Pipes 17 and 18 are adjustably connected together by the improved coupling, (shown in detail in Fig. 9,) which provides, with coupling 6, a ready means for connecting and disconnecting the burner from the oil and steam pipes. When it is desired to blow out the oil-passage leading to the tip and the oil-conduits in the tip with steam, the steam by-pass is opened and cut-off cock 4 is closed. At the same time the strainer can be cleaned by steam by opening cut-off cock 5.

It will be noted that the commingled atomizing and burning steam and oil will envelop the oil-chamber 54, which is thereby transformed into a superheating-chamber for heating the oil before the same is discharged upon the steam-jet from the steam-discharge slot.

Having thus described my invention, I claim as new and desire to secure by Letters Patent—

1. In a hydrocarbon-burner two valves having valve-stoppers in shape the frustum of a cone, adjustably connected together at their smaller ends, and adapted to be locked together whereby both valve-stoppers rotate as one, one of said valve-stoppers being provided with a lever and being adapted to control the flow of oil to the burner-tip and the other valve-stopper being adapted to control the flow of steam to the burner-tip.

2. In a hydrocarbon-burner, a burner-tip therefor, comprising a casing having a central opening therethrough, a second opening at the side of the central opening; an open chamber in communication with said second opening, a plug having a flange projecting beyond the top of the casing-tip; said plug provided with a central opening extending longitudinally to near the top of said plug and communicating with said central opening in said casing; said plug having a plurality of ports extending therethrough above said flange, said second opening communicating with the chamber below said flange; said flange and casing-tip forming a discharge-slot from said chamber; and a cap affixed to the top of the plug and projecting below the top of said flange and forming a discharge-slot thereabout, said ports communicating with the last-named discharge-slot.

3. In a hydrocarbon-burner, a burner-tip therefor, comprising a casing having a central opening therethrough, a second opening at the side of the central opening; an open chamber in communication with said second opening; a plug having a flange projecting beyond the top of the casing-tip; a segmental regulating-ring between said flange and casing-tip; said plug provided with an opening extending longitudinally to near the top of said plug and communicating with said central opening in said casing; said plug having a plurality of ports extending therethrough above said flange; said second opening communicating with the chamber below said flange; said flange and casing-tip forming a discharge-slot from said chamber; a cap affixed to the top of the plug and projecting below the top of said flange; and a segmental regulating-ring between said cap and flange.

4. In a hydrocarbon-burner, a burner-tip comprising a casing having an open steam-chamber and steam and oil inlets, a plug connected with said casing and having a flange projecting beyond the top of said chamber, said plug provided with a central opening extending longitudinally from said oil-inlet to near the top thereof and with a plurality of ports extending from said central opening through the plug above said flange, said flange and the chamber-wall forming an annular slot, a segmental regulating-ring therein, a cap affixed to the top of the plug and projecting below the top of the flange and forming an oil-discharge slot to which said ports communicate, and a segmental regulating-ring between said cap and flange.

5. In a hydrocarbon-burner, a burner-tip comprising a casing having an open steam-chamber and steam and oil inlets, a plug connected with said casing and having a flange projecting beyond the top of said chamber, said plug provided with a central opening extending longitudinally from said oil-inlet to near the top thereof and with a plurality of ports extending out, from said central opening, above said flange, said flange and the chamber-wall forming an annular discharge-slot; the slot-forming wall of said flange provided with a groove, said tip provided with an oppositely-disposed groove, a segmental regulating-ring seated in said grooves, a cap affixed to the top of the plug and projecting below the top of said flange and forming an oil-discharge slot to which said ports communicate, and a segmental regulating-ring between said cap and flange.

6. In a hydrocarbon-burner, a burner-tip therefor comprising a casing having a central opening therethrough, a second opening at one side of the central opening and an open chamber in communication with said second opening; a plug having two flanges; the upper flange projecting beyond the top of the casing-tip and forming a discharge-slot therefrom; a central opening extending longitudinally from said central opening to near the top of the plug and having a plurality of ports extending through the plug above the top flange, ports in the lower flange connecting the space between the flanges in the casing of the tip; a cap affixed to the top of the plug projecting below and beyond the top flange thereof and forming an oil-discharge slot into which the upper ports communicate.

7. A burner-tip for a hydrocarbon-burner, adapted to use steam and oil, comprising a casing having a central and a side passage therethrough; a plug attached to said casing having two flanges, the upper one of which projects beyond the lower and forms with the rim of the casing an annular discharge-slot, and having a central opening registering with the central passage of the casing, extending therein to above the top flange; ports extending through the plug and terminating above the upper flange; ports in the lower flange connecting the space between the flanges with the side passage in the casing; annular channels in the upper and lower faces of the upper flange; sections of annular rings in said flanges; a cap attached to said plug extending beyond and below the top flange of the plug and forming an oil-discharge slot into which said ports communicate; an annular internally-threaded ring screwed on the tip-casing, the upper edge of said last-named ring being spaced apart from the lower surface of said upper flange and the direction of the flow of steam being controlled thereby.

8. In the herein-described hydrocarbon-burner means to detach the burner-tip and connecting-pipes from the regulating-valves comprising a coupling member externally and centrally threaded; said member having a central passage therethrough in the front end of which is screwed the oil-conduit which leads to the burner-tip, the rear end of which when in place registering with the passage leading from the oil-regulating valve; ports through said member exterior the oil-conduit opening into the steam-conduit which leads the steam to the burner-tip, which said conduit is screwed into the front end of said member; an internally-threaded coupling-ring having a handle, said coupling-ring being adapted to screw upon said coupling member and attach the same to the casing of the valve-chambers.

9. A burner-tip for a hydrocarbon-burner adapted to use steam and oil, comprising a casing having a central and a side passage therethrough; a plug attached to said casing having two flanges, the upper one of which projects beyond the lower and forms with the rim of the casing a discharge-slot, and having a central opening registering with the central passage of the casing, extending therein to above the top flange; ports extending through the plug and terminating above the upper flange; ports in the lower flange connecting the space between the flanges with the side passage in the casing; annular channels in the upper and lower faces of the upper flange; sections of annular rings in said flanges; a cap attached to said plug extending beyond and below the top flange of the plug and forming an oil-discharge slot into which said ports communicate; an annular internally-threaded ring screwed on the tip-casing; an annular ring above the threaded ring.

10. A burner-tip for a hydrocarbon-burner comprising a body having an open steam-chamber, a hollow plug forming a second chamber or oilway therein, said plug having a flange or portion extending beyond the rim of the wall of said first chamber and forming an annular discharge-slot, a cap above said flange forming a chamber thereabove, said plug opening thereinto, said cap extending down and forming an annular oil-discharge slot, and oil and steam supply pipes connected with said respective chambers.

11. A burner-tip for a hydrocarbon-burner comprising a body having an open steam-chamber, a hollow plug forming a second chamber or oilway therein, said plug having a portion extending beyond the rim of the wall of said first chamber, and forming an annular discharge-slot, a segmental direction-giving ring in said slot, a cap above said portion forming a chamber thereabove, said plug opening thereinto, said cap extending down and forming an annular oil-discharge slot, a segmental direction-giving ring in said slot, and oil and steam pipes connected to said respective chambers.

12. A burner-tip having two annular discharge-slots, means for supplying oil and expansive medium to respective slots, and segmental direction-giving rings partially closing said slots.

13. A burner-tip having two annular discharge-slots, means for supplying oil and expansive medium to respective slots, means for directing the oil from the oil-discharge slot downwardly and right-angularly toward the expansive-medium discharge-slot at the point of highest pressure of the outflowing expansive medium, and means, in connection with said discharge-slots, for closing portions thereof.

14. In combination, in a hydrocarbon-burner, a body having an open steam-chamber, a hollow plug forming a second chamber or oilway therein, said plug having a portion extending beyond the rim of the wall of said first chamber and forming an annular steam-discharge slot, a segmental direction-giving ring in said slot, a cap above said portion forming a chamber thereabove, said plug opening thereinto, said cap extending downward forming an annular oil-discharge slot, a segmental direction-giving ring in said slot, steam and oil pipes connected with said respective chambers, and a second steam-pipe operatively connected with said second chamber whereby said oil-discharge slot and the burner may be cleaned.

15. A burner-tip comprising a cylindrical body having a steam chamber or way, an oil-way, an annular peripheral steam-discharge slot, an annular oil-discharge slot above said steam-discharge and discharging oil downward right-angularly upon the steam from said steam-discharge at its point of commencement of expansion, and segmental direction-giving rings partially closing said slots.

16. A burner-tip provided with a laterally-discharging annular steam-discharge slot and an annular oil-discharge slot opening right-angularly above said steam-discharge and adapted to direct oil upon said steam at its point of initial expansion, and segmental regulating or direction-giving rings closing portions of said slots.

17. A burner-tip comprising a cylindrical steamway open at its discharge end, an oil-way, a wall of which partially closes the discharge end of said steamway, forming an annular peripheral discharge, said oilway provided with an annular discharge discharging oil right-angularly upon said steam at its point of initial expansion, and means in connection with said steam and oil discharges, for closing portions of said discharges.

18. The combination in a hydrocarbon-burner of a longitudinal supply-pipe, annular chambers surrounding said pipe, a diaphragm extending substantially at right angles with the axis of the chambers, and dividing said chambers, and discharge-outlets from said chambers adjacent to said diaphragm.

19. The combination in a hydrocarbon-burner, of a casing, a longitudinal central pipe, annular chambers between said pipe and casing, a diaphragm extending substantially at right angles with the axis of the chambers and dividing said chambers into separate oil and steam-compartments, and annular discharge-outlets between each of said compartments and the diaphragm.

20. The combination in a hydrocarbon-burner of a central oil-feed pipe, a concentric enveloping shell, annular chambers between said shell and pipe, ports in said pipe communicating with one of said chambers, the other chamber adapted as a steam-chamber, and converging annular discharge-orifices from said chambers intermediate of the ends of said shell through which the oil and steam are separately discharged, commingling exterior to the shell, the commingled product enveloping the said oil-chamber which is thereby transformed into a superheater.

In testimony whereof witness my hand, this 2d day of February, 1903, at Los Angeles, California.

LOUIS K. LEAHY.

In presence of—
FREDERICK S LYON,
B. RANDALL.